United States Patent
Chang et al.

(10) Patent No.: US 6,786,298 B1
(45) Date of Patent: Sep. 7, 2004

(54) VIBRATION-ABSORBING STRUCTURE FOR SUPPORT SECTION OF A SELF-VIBRATORY ELECTRONIC MEMBER

(75) Inventors: Lin-Yang Chang, Taipei (TW); Yu Lu, Taipei (TW)

(73) Assignee: Compal Electronics Inc., Taipei (TW)

( * ) Notice: Subject to any disclaimer, the term of this patent is extended or adjusted under 35 U.S.C. 154(b) by 0 days.

(21) Appl. No.: 10/436,090

(22) Filed: May 13, 2003

(51) Int. Cl.[7] .................................................. F16F 7/00
(52) U.S. Cl. ...................................... 181/207; 181/208
(58) Field of Search .............................. 181/207, 208, 181/209, 248; 248/56; 188/268; 267/132

(56) References Cited

U.S. PATENT DOCUMENTS

| | | | |
|---|---|---|---|
| 3,684,052 A | * | 8/1972 | Sotome ...................... 381/398 |
| 4,315,558 A | * | 2/1982 | Katayama ................... 181/227 |
| 4,673,156 A | * | 6/1987 | Tabata .................... 267/140.13 |
| 4,835,972 A | * | 6/1989 | Tugal et al. ................. 62/50.1 |

* cited by examiner

Primary Examiner—Kimberly Lockett
(74) Attorney, Agent, or Firm—Bacon & Thomas, PLLC

(57) ABSTRACT

A vibration-absorbing structure for support section of a self-vibratory electronic member. The vibration-absorbing structure is integrally made of resilient gum material and has a top face, a bottom face, at least one insertion section between the top and bottom faces and at least one horseshoe-shaped or annular spacer (bellows) structure having multiple continuously winding layers and connected between the insertion section and the top and bottom faces. The top and bottom faces are fixed on a support article and the support section of the electronic member is fitted in the insertion section. Each annular spacer structure defines a resiliently extensible interval to enlarge the vibration-absorbing space and create a vibration-absorbing effect as a reciprocally extensible spring.

19 Claims, 6 Drawing Sheets

VIBRATION-ABSORBING STRUCTURE FOR SUPPORT SECTION OF A SELF-VIBRATORY ELECTRONIC MEMBER

BACKGROUND OF THE INVENTION

The present invention is related to a vibration-absorbing structure for support section of a self-vibratory electronic member. The vibration-absorbing structure is integrally made of resilient gum material and has a top face, a bottom face and at least one insertion section between the top and bottom faces, whereby the support section of the electronic member can be fitted in the insertion section. At least one annular bellows structure is formed between the top and bottom faces and the insertion section to enlarge the vibration-absorbing and buffering space to create a vibration-absorbing effect as a reciprocally extensible spring.

Conventionally, springs, rubber pads and air cushions are used as shock-absorbing or vibration-absorbing members. Such conventional shock-absorbing or vibration-absorbing structures are disclosed in Taiwanese Patent Publication No. 498951 entitled "rubber anti-shock pad structure", Taiwanese Patent Publication No. 493046 entitled "shock-absorbing pad", Taiwanese Patent Publication No. 475674 entitled "anti-shock air cushion" and Taiwanese Patent Publication No. 435914 entitled "anti-shock seat for a speaker".

In Taiwanese Patent Publication No. 498951, a rigid board having a bolt hole is disposed in the rubber pad. The rubber pad is formed with a sink corresponding to the bolt hole of the rigid board. The periphery of the pad body is formed with through holes.

Fixing pins are previously disposed on the ground in cooperation with the through holes for locking the rubber pad on the ground. A fixing bolt is screwed through the sink of the pad and the bolt hole of the rigid board to fix the bed of a machine. In Taiwanese Patent Publication No. 493046, the shock-absorbing pad is applicable to a leg seat of a production equipment. The rubber pad has a first and a second surfaces. The first surface has a leg seat hole in which the leg seat is fitted. In addition, the first surface has multiple cavities around the leg seat hole. The second surface is provided with multiple suckers. The anti-shock air cushion of Taiwanese Patent Publication No. 475674 includes a hollow main body and a column extending from the main body. An air chamber is defined between the inner wall of the main body and the column. The anti-shock seat for a speaker of Taiwanese Patent Publication No. 435914 includes a soft base seat and a support seat. A boss projects from the bottom of the support seat. The top of the support seat is formed with a dent. The bottom of a soft pad is fitted in the dent of the support seat. The base seat is formed with a through hole passing through the base seat from top end to bottom end thereof. The boss of the support seat is fitted in the top end of the through hole. The outer wall is formed with annular grooves. In use, the bottom side of the base seat is attached to the ground. The bottom side of the speaker is rested on the top side of the soft pad. The through hole of the base seat is blocked by the boss and the ground to form an air chamber. The outer wall is formed with annular grooves to form a resilient body. In cooperation with the support seat and the soft pad, the resilient body can absorb the shocking force of the speaker. All the above conventional shock-absorbing members are solid rubber body with complicated structures.

FIGS. 5A to 6B show a conventional solid rubber buffering pad 50. The solid rubber pad 50 includes an upper plane face 51, a lower plane face 52 and a hollow short column 53 connected between the upper and lower plane faces. An annular groove 55 is formed around the short column 53. The short column 53 of the buffering pad 50 is fitted in an insertion hole 62 of a fixing end of a self-vibratory electronic member 60 (such as a small speaker). A fixing member such as a screw is passed through the through hole 54 to lock the buffering pad 50 on a support article. The rubber buffering pad 50 is resilient to provide a vibration-absorbing effect. However, such vibration-absorbing effect is insufficient. Moreover, when integrally connected with other parts, co-vibration tends to take place to emit noise.

SUMMARY OF THE INVENTION

It is therefore a primary object of the present invention to provide a vibration-absorbing structure for support section of a self-vibratory electronic member. The vibration-absorbing structure is integrally made of resilient material such as rubber and has at least one horseshoe-shaped or annular bellows structure having multiple continuously winding layers. The vibration-absorbing space is enlarged to create a vibration-absorbing effect as a reciprocally extensible spring.

The present invention can be best understood through the following description and accompanying drawings wherein:

DETAILED DESCRIPTION OF THE PREFERRED EMBODIMENTS

Figure 1A:
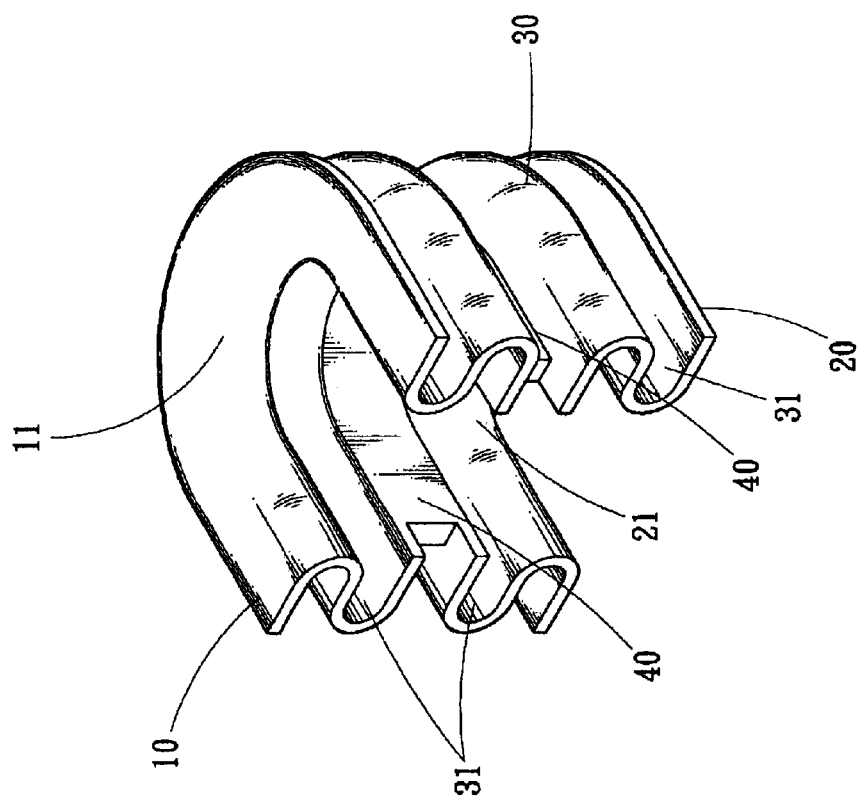
FIG. 1A is a perspective view of a preferred embodiment of the present invention.
Figure 1B:
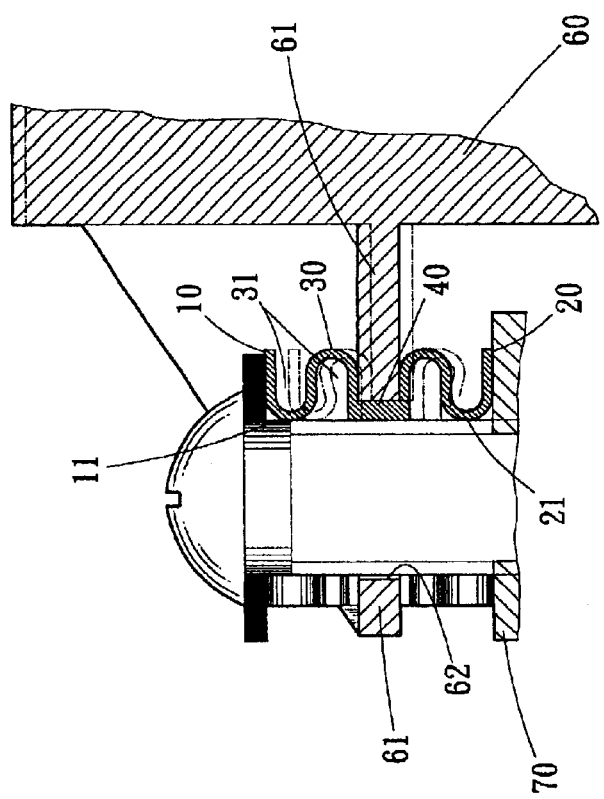
FIG. 1B is a side sectional view of the embodiment of FIG. 1A, showing the application thereof.
Figure 2B:
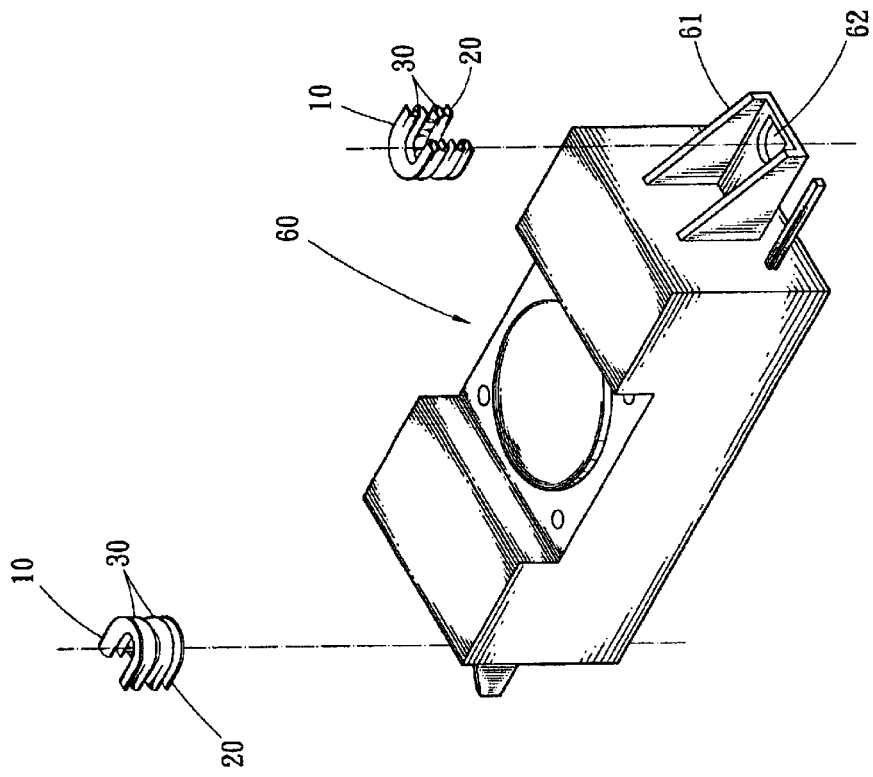
FIG. 2B is a perspective exploded view according to FIG. 2A.
Figure 2A:
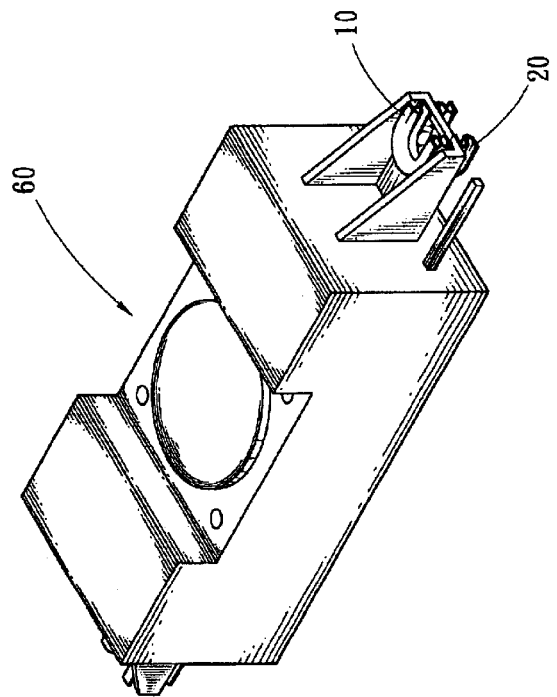
FIG. 2A is a perspective view showing that the embodiment of FIG. 1A is connected with a support section of a vibratory member.
Figure 3A:
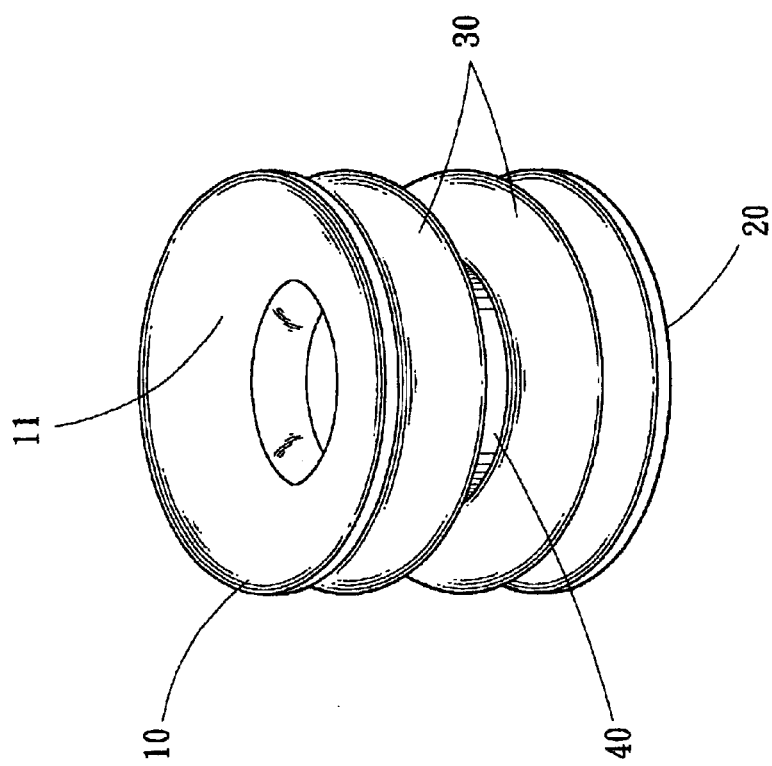
FIG. 3A is a perspective view of another preferred embodiment of the present invention.
Figure 3B:
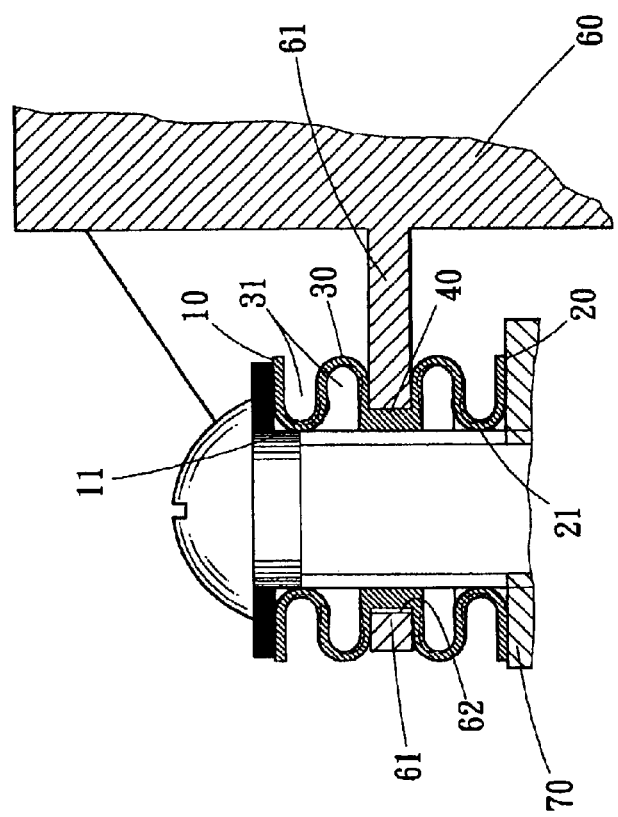
FIG. 3B is a side sectional view of the embodiment of FIG. 3A, showing the application thereof.
Figure 4A:
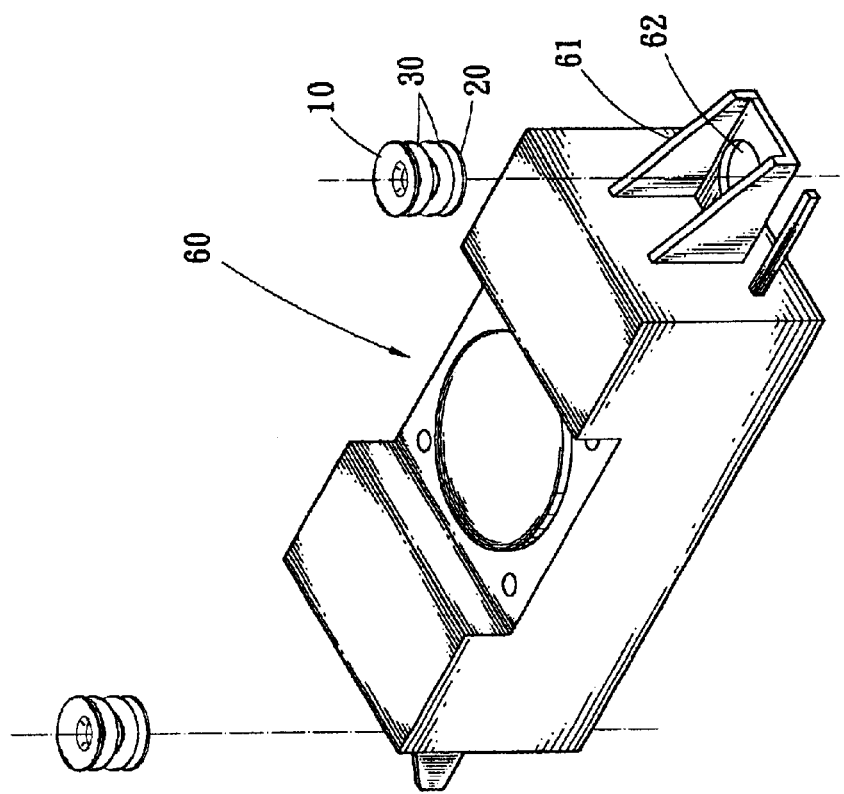
FIG. 4A is a perspective view showing that the embodiment of FIG. 3A is connected with a support section of a vibratory member.
Figure 4B:
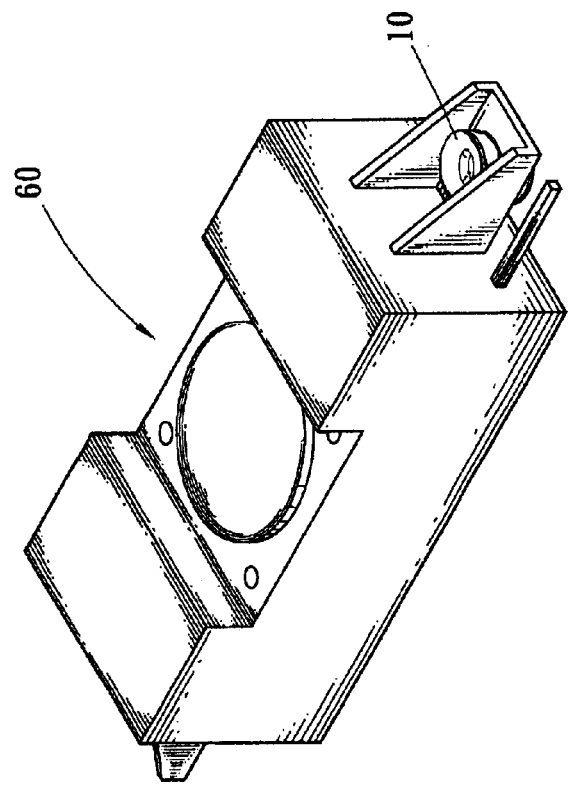
FIG. 4B is a perspective exploded view according to FIG. 4A.
Figure 5A:
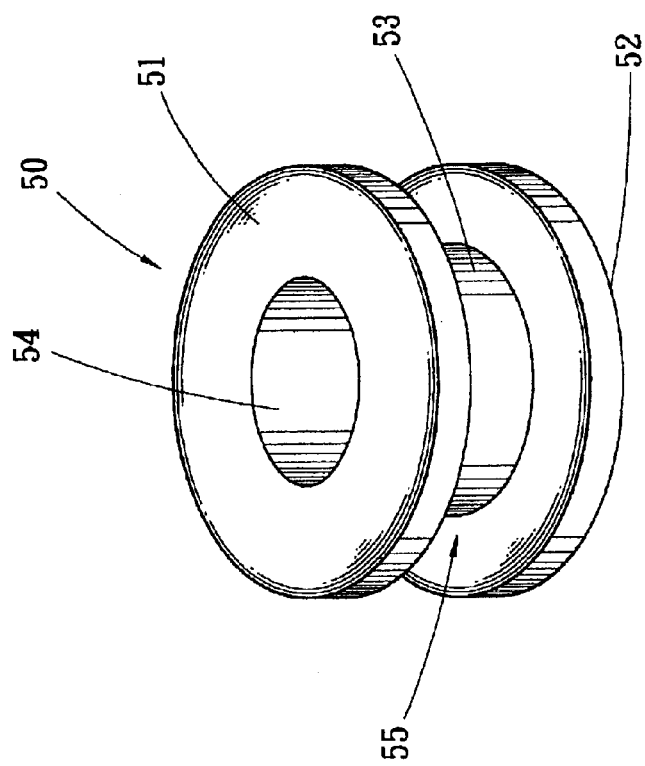
FIG. 5A is a perspective view of a conventional solid rubber buffering pad.
Figure 5B:
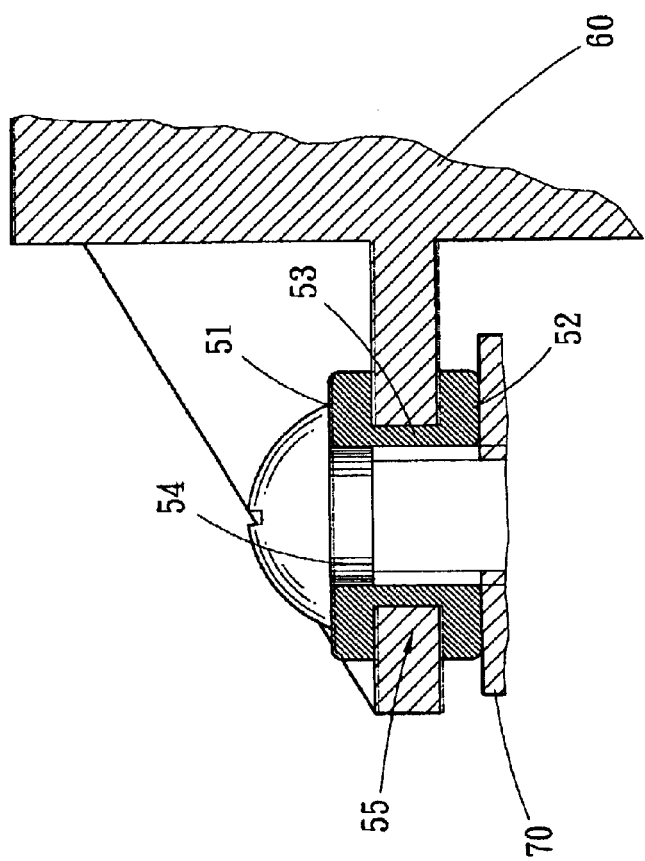
FIG. 5B is a side sectional view of the buffering pad of FIG. 5A, showing the application thereof.
Figure 6A:
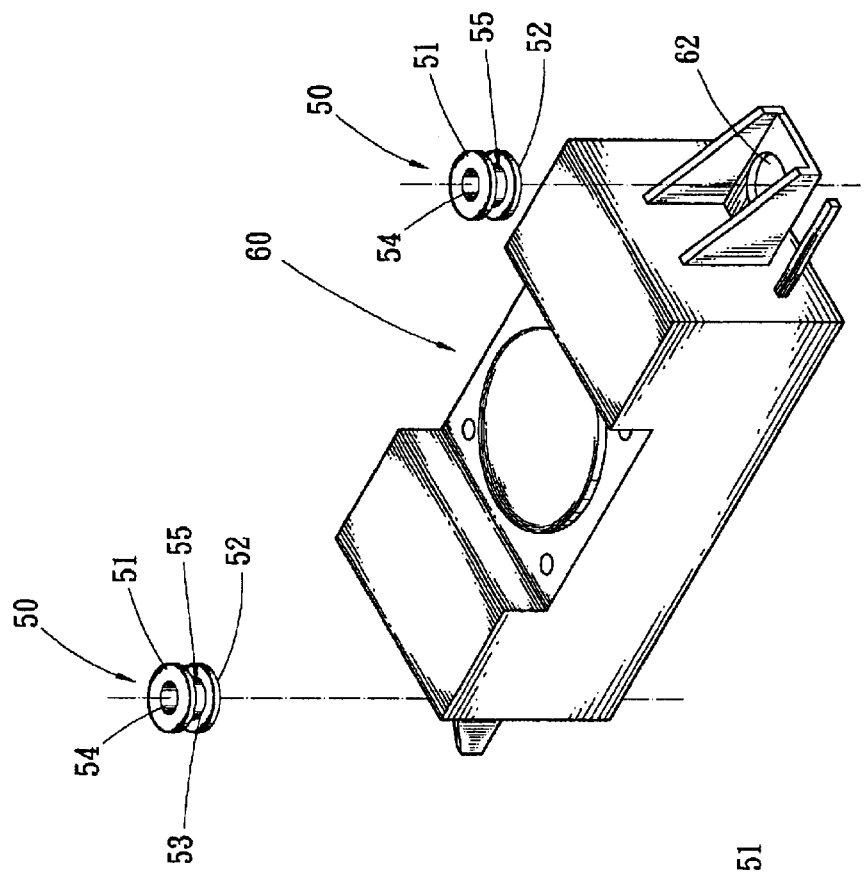
FIG. 6A is a perspective view showing that the buffering pad of FIG. 5A is applied to a vibratory member.
Figure 6B:
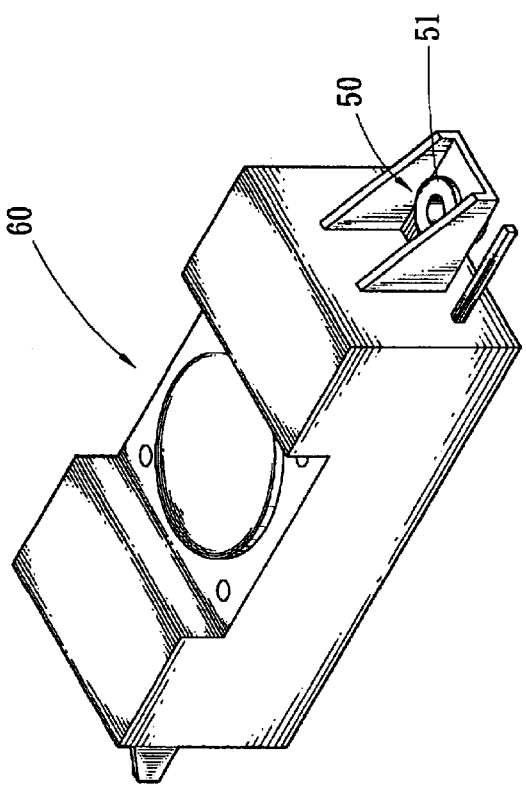
FIG. 6B is a perspective exploded view according to FIG. 6A.

Please refer to FIGS. 1A and 1B. The present invention is integrally made of rubber and includes a top face 10, a bottom face 20, at least one insertion section 40 between the top and bottom faces and at least one horseshoe-shaped or annular spacer structure 30 having multiple continuously winding layers connected between the insertion section 40 and the top and bottom faces. The top and bottom faces 10, 20 are wound by a certain curvature to form a horseshoe-shaped face or an annular shape (as shown in FIGS. 3A and 3B). At least one smooth curved face 11, 21 which is back and forth wound by the same curvature is connected with each of the top and bottom faces 10, 20 to form the horseshoe-shaped spacer structure 30 (as an extensible bellows made of gum membrane). Each horseshoe-shaped spacer structure 30 defines a resiliently extensible interval 31. At least one insertion section 40 is connected between the horseshoe-shaped spacer structures 30, in which a support section 61 of an electronic vibratory member 60 (such as a speaker) is fixedly inserted.

Referring to FIGS. 2A and 2B and 4A and 4B, the insertion section 40 of the present invention is fitted into an insertion hole 62 of the support section 61 of the vibratory member 60. Then the top and bottom faces 10, 20 of the present invention are fixed on a support article 70.

The present invention is able to effectively absorb and buffer the vibration of the vibratory member 60 and minimize the transfer of the vibration. The present invention is integrally made of resilient vibration-absorbing gum material such as rubber and the horseshoe-shaped spacer structures 30 (or bellows structure) are integrally formed between the top and bottom faces 10, 20 and the insertion section 40. The horseshoe-shaped spacer structures 30 define multiple layers of resiliently extensible intervals 31 and can be compressed so that the vibration-absorbing space is enlarged to create a vibration-absorbing effect as a reciprocally extensible spring.

The above embodiments only used to illustrate the present invention, not intended to limit the scope thereof. Many modifications of the above embodiments can be made without departing from the spirit of the present invention. For example, the horseshoe-shaped spacer structure 30 can have a cross-section which is bent by right angle or obliquely bent.

What is claimed is:

1. A vibration-absorbing structure for a support section of a self-vibratory electronic member, comprising:
   a top face,
   a bottom face,
   said vibration-absorbing structure being integrally made of resilient gum material,
   at least one annular or horseshoe-shaped spacer structure having continuously back and forth winding layers connected between the top and bottom faces, and
   the at least one annular or horseshoe-shaped spacer structure defining a resiliently extensible interval.

2. The vibration-absorbing structure as claimed in claim 1, wherein at least one necked insertion section is formed in the annular spacer structure between the top and bottom faces, whereby the support section of the electronic member can be fitted in the insertion section.

3. The vibration-absorbing structure as claimed in claim 1, wherein the resilient gum material is rubber.

4. The vibration-absorbing structure as claimed in claim 1, wherein the annular spacer structure is formed by a back and forth smoothly wound and curved gum membrane.

5. The vibration-absorbing structure as claimed in claim 2, wherein the annular spacer structure is formed by a back and forth smoothly wound and curved gum membrane.

6. The vibration-absorbing structure as claimed in claim 3, wherein the annular spacer structure is formed by a back and forth smoothly wound and curved gum membrane.

7. The vibration-absorbing structure as claimed in claim 1, wherein the annular spacer structure is formed by a back and forth right angle bent gum membrane.

8. The vibration-absorbing structure as claimed in claim 2, wherein the annular spacer structure is formed by a back and forth right angle bent gum membrane.

9. The vibration-absorbing structure as claimed in claim 1, wherein the annular spacer structure is formed by a back and forth obliquely bent gum membrane.

10. The vibration-absorbing structure as claimed in claim 2, wherein the annular spacer structure is formed by a back and forth obliquely bent gum membrane.

11. The vibration-absorbing structure as claimed in claim 1, wherein the top and bottom faces of the spacer structure are two horseshoe-shaped faces parallel to each other.

12. The vibration-absorbing structure as claimed in claim 2, wherein the top and bottom faces of the spacer structure are two horseshoe-shaped faces parallel to each other.

13. The vibration-absorbing structure as claimed in claim 1 wherein the top and bottom faces of the spacer structure are two annular faces parallel to each other.

14. The vibration-absorbing structure as claimed in claim 2, wherein the top and bottom faces of the spacer structure are two annular faces parallel to each other.

15. The vibration-absorbing structure as claimed in claim 1, wherein the intervals defined by the annular spacer structures are equal.

16. The vibration-absorbing structure as claimed in claim 2, wherein the intervals defined by the annular spacer structures are equal.

17. The vibration-absorbing structure as claimed in claim 1, wherein the annular spacer structure is formed as an extensible bellows made of gum membrane.

18. The vibration-absorbing structure as claimed in claim 2, wherein the annular spacer structure is formed as an extensible bellows made of gum membrane.

19. The vibration-absorbing structure as claimed in claim 3, wherein the annular spacer structure is formed as an extensible bellows made of gum membrane.

* * * * *